US010691495B2

(12) United States Patent
Lu et al.

(10) Patent No.: US 10,691,495 B2
(45) Date of Patent: Jun. 23, 2020

(54) VIRTUAL PROCESSOR ALLOCATION WITH EXECUTION GUARANTEE

(71) Applicant: VMware, Inc., Palo Alto, CA (US)

(72) Inventors: Xunjia Lu, Los Altos, CA (US); Haoqiang Zheng, Cupertino, CA (US); Bi Wu, Santa Clara, CA (US)

(73) Assignee: VMware, Inc., Palo Alto, CA (US)

( * ) Notice: Subject to any disclaimer, the term of this patent is extended or adjusted under 35 U.S.C. 154(b) by 143 days.

(21) Appl. No.: 16/045,075

(22) Filed: Jul. 25, 2018

(65) Prior Publication Data

US 2020/0034201 A1 Jan. 30, 2020

(51) Int. Cl.
*G06F 9/50* (2006.01)
*G06F 9/455* (2018.01)
*G06F 9/48* (2006.01)

(52) U.S. Cl.
CPC ............ *G06F 9/5027* (2013.01); *G06F 9/455* (2013.01); *G06F 9/45533* (2013.01); *G06F 9/45558* (2013.01); *G06F 9/48* (2013.01); *G06F 9/4843* (2013.01); *G06F 9/4881* (2013.01); *G06F 9/50* (2013.01); *G06F 9/5005* (2013.01); *G06F 9/5061* (2013.01); *G06F 9/5077* (2013.01)

(58) Field of Classification Search
CPC .. G06F 9/455; G06F 9/45533; G06F 9/45558; G06F 9/48; G06F 9/4843; G06F 9/4881; G06F 9/50; G06F 9/5005; G06F 9/5027; G06F 9/5061
See application file for complete search history.

(56) References Cited

U.S. PATENT DOCUMENTS

| | | | | |
|---|---|---|---|---|
| 8,839,256 B2 * | 9/2014 | Achilles | ................. | G06F 9/505 718/102 |
| 2012/0036512 A1 * | 2/2012 | Chung | .................. | G06F 9/4881 718/103 |
| 2014/0157038 A1 * | 6/2014 | Ashok | ....................... | G06F 9/44 714/2 |
| 2015/0058861 A1 * | 2/2015 | Zheng | ................... | G06F 9/4887 718/104 |
| 2018/0101486 A1 * | 4/2018 | Lu | ......................... | G06F 9/5088 |
| 2018/0136976 A1 * | 5/2018 | Ammari | ................ | G06F 9/4881 |

* cited by examiner

*Primary Examiner* — Charles M Swift
(74) *Attorney, Agent, or Firm* — Patterson + Sheridan, LLP

(57) ABSTRACT

The disclosure provides techniques for scheduling a jitterless workload on a virtual machine (VM) executing on a host comprising one or more pCPUs comprising a first subset of the one or more pCPUs and a second subset of the one or more pCPUs. The techniques further include creating a jitterless zone, wherein the jitterless zone includes the first subset of the one or more pCPUs. The techniques further include determining whether a vCPU of the VM is used to execute a jitterless workload or a non-jitterless workload. The techniques further include allocating by a CPU scheduler to the vCPU at least one of the pCPUs in the jitterless zone when the vCPU of the VM is used to execute a jitterless workload. The techniques further include scheduling the jitterless workload for execution by the vCPU on the allocated at least one of the pCPUs in the jitterless zone.

21 Claims, 4 Drawing Sheets

VIRTUAL PROCESSOR ALLOCATION WITH EXECUTION GUARANTEE

BACKGROUND

Software defined networking (SDN) comprises a plurality of hosts in communication over a physical network infrastructure, each host having one or more virtual computing instances (VCIs) such as virtual machines (VMs) or containers that are connected to logical overlay networks that can span multiple hosts and are decoupled from the underlying physical network infrastructure. Though certain aspects herein are described with respect to VMs, it should be noted that the same aspects may be similarly used for other types of VCIs.

Virtualization software such as a hypervisor facilitates the creation and execution of VMs on a host. Hypervisors serve as an interface between VMs and the hardware resources of the hosts. A hypervisor can abstract processor, memory, storage, and networking resources of a host to allocate the host's hardware resources to multiple VMs.

For example, a host may have one or more physical CPUs (pCPUs). Each of the one or more pCPUs may be capable of operating at a particular frequency (e.g., measured in MHz, GHz, etc.). Further, different pCPUs may be capable of operating at the same or different frequencies. Similarly, each VM on a host may be defined as having one or more vCPUs. Different VMs may have the same or different number of vCPUs. A vCPU is seen by a VM as a physical CPU core by the VM's operating system. The hypervisor abstracts pCPU resources of the host into the vCPUs used by the VMs.

In particular, a hypervisor allocates pCPU resources of a host to a VM (i.e., to vCPUs of a VM), in part, using configuration metrics. The pCPU resources of the host are allocated using CPU resource allocation metrics such as a CPU reservation resource allocation metric (e.g., referred to as a reservation metric), a CPU limit resource allocation metric (e.g., referred to as a limit metric), and a CPU shares resource allocation metric (e.g., referred to as a shares metric) as explained below.

A CPU reservation resource allocation metric for a VM provides a guarantee of pCPU resources for the VM. In particular, a CPU reservation resource allocation metric is typically specified in MHz, and is a guarantee for clock cycles per second of pCPUs of a host (e.g., divided across any number of pCPUs of the host). As discussed, each of the pCPUs of a host may operate at a particular frequency. The sum of the frequencies of the pCPUs of the host corresponds to the total frequency or total clock cycles per second available at the host. A CPU reservation resource allocation metric guarantees a portion of the total frequency available at the host to the VM, meaning the portion of the total frequency available at the host for the VM is guaranteed as divided among the vCPUs of the VM. Accordingly, when a CPU reservation resource allocation metric provides a reservation for a certain amount of clock cycles for a certain VM, a CPU scheduler will guarantee the pCPU resources (e.g., 1 GHz of pCPU clock cycles per second of the host) to the VM provided by the CPU reservation resource allocation metric.

Typically, when the VM is not using all of its reserved pCPU resources, the pCPU resources are not wasted by the host, but rather the hypervisor can allocate them serially or concurrently to other VMs. Thus a CPU reservation resource allocation metric is used to provide a VM access to pCPUs of the host to support vCPUs in a committed environment (e.g., the pCPU is also reserved by other VMs). It will be appreciated that because VMs typically do not use all of the pCPU resources allocated by a hypervisor, a hypervisor may allocate pCPU resources to a plurality of VMs so long as the total workload for all VMs will not exceed the pCPU resources at any given time. It will be further appreciated that a CPU reservation resource allocation metric may also be specified in a percent of pCPU resources (e.g., a 50% reservation of clock cycles of pCPUs of a host). It will be appreciated that a pCPU may refer to a core of a CPU.

A CPU limit resource allocation metric is typically specified in MHz and sets an upper maximum amount of pCPU resources that can be allocated to a VM. More specifically, the CPU limit resource allocation metric prevents a VM from using more clock cycles per second of pCPUs of the host (e.g., divided across any number of pCPUs of the host) than the CPU limit resource allocation metric provides even if more clock cycles per second are not being used and are available. In this case, the VM's performance is restricted by the CPU limit resource allocation metric even though the host has further capacity. This is used to prevent a VM from using too much of a host's resources at any given time. It will be further appreciated that a CPU limit resource allocation metric may also be specified in a percent of pCPU resources.

A CPU shares resource allocation metric provides a number of shares of a VM. For example, a VM is typically configured with a certain number of shares (e.g., 1000 shares) by a hypervisor. In a default setting, each VM may be configured with an equal number of shares, but it will be appreciated that the number of shares can be allocated using a hypervisor as needed for the VMs (e.g., to prioritize a first VM over a second VM). The CPU shares resource allocation metric is used to govern CPU resource distribution as long as other resource allocation metrics are not violated. Thus, the CPU shares resource allocation metric provides a selection mechanism for access to the pCPUs by providing a relative importance level between VMs. In certain aspects, when there is a case of contention for pCPU resources, a first VM associated with a higher number of shares gets access to the pCPU resources over a second vCPU associated with a lower number of shares. In other aspects, when there is a case of contention for pCPU resources, vCPUs get access to the pCPU resources proportionality to the number of shares associated with each vCPU (e.g., $vCPU_1$ of $VM_1$ with an allocated 1000 shares gets half the amount of pCPU resources as $vCPU_2$ of $VM_2$ with an allocated 2000 shares).

The CPU resource allocation metrics described above can result in vCPU latency for VMs of about hundreds of milliseconds, meaning there may be hundreds of milliseconds or more of time in between when a VM requests use of a vCPU for processing a workload and when pCPU resources are actually made available to the vCPU for processing the workload. Further, the vCPUs also experience unbounded (or random) jitter as the latency may vary over time from hypervisor contexts. This is because the current CPU resource allocation metrics are based on overall utilization (throughput) of pCPUs of a host. For example, as discussed, the hypervisor may have overcommitted the pCPU resources of a host. In this case, the hypervisor may not be able to provide all VMs with the requested pCPU resources at a given time. It will be appreciated that this can cause poor performance (e.g., high latency) when processing a workload on a VM. It will be appreciated that this can lead to situations where certain VMs have to wait for an unreasonable amount of time for the pCPU resources. It will be further appreciated, that the above CPU resource allocation metrics do not provide a latency guarantee.

Such jitter and latency may not be suitable for executing certain workloads. For example, workloads in internet connected devices (e.g., IoT Edge gateway devices, etc.) and network functions virtualization (NFV) in data driven industries, such as the telecommunications industry, often require certain quality of service (QoS) standards (e.g., performance, availability, and reliability) to meet a certain service level agreement (SLA). In order to execute such workloads in VMs, this translates into needing a predictable responsiveness of such VMs with controlled latency and jitter that meets the SLA criteria. For example, SLA in the telecommunications industry for NFV often requires millisecond or even sub-millisecond CPU latency with predictable performance (e.g., an error ratio of one bit error in $10^6$).

Current solutions for meeting certain SLAs for a workload executing in a VM include a CPU resource allocation that dedicates at least one pCPU in a host for each vCPU of the VM executing the workload. This is referred to as physical core pinning, and it is associated with certain drawbacks including higher associated costs and efficiency losses. Physical core pinning is associated with higher costs and efficiency losses, in part, because the dedicated pCPU can no longer be time-shared across multiple vCPUs such as across multiple VMs, forgoing a significant benefit to using vCPUs. Thus there exists a need to provide execution of workloads on a VM while meeting certain CPU QoS requirements (e.g., SLA QoS requirements of millisecond or sub-millisecond latency), without the need to pin a vCPU to a pCPU.

SUMMARY

The present disclosure provides techniques of scheduling a jitterless workload on a virtual machine (VM) executing on a host comprising one or more physical central processing units (pCPUs) comprising a first subset of the one or more pCPUs and a second subset of the one or more pCPUs. In certain aspects, the techniques include creating a jitterless zone, wherein the jitterless zone includes the first subset of the one or more pCPUs. The techniques further include determining whether a virtual central processing unit (vCPU) of the VM is used to execute a jitterless workload or a non jitterless workload. The techniques further include, when the vCPU is determined to execute the jitterless workload, allocating by a central processing unit (CPU) scheduler to the vCPU at least one of the pCPUs in the jitterless zone, and scheduling the jitterless workload for execution by the vCPU on the allocated at least one of the pCPUs in the jitterless zone, and when the vCPU is determined to execute the non-jitterless workload, allocating by the CPU scheduler to the vCPU at least one of the pCPUs of the first subset or the second subset, and scheduling the non-jitterless workload for execution by the vCPU on the allocated at least one of the pCPUs of the first subset or the second subset.

Further embodiments include a non-transitory computer-readable storage medium storing instructions that, when executed by a computing system, cause the computing device to perform the method set forth above, and a computing system programmed to carry out the method set forth above.

Further embodiments include a computing system configured to carry out the method set forth above.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The present disclosure provides techniques to execute a workload with a vCPU of VM that satisfies a CPU QoS requirement without the need to exclusively dedicate a pCPU of a host to a single vCPU of the VM.

Figure 1A:
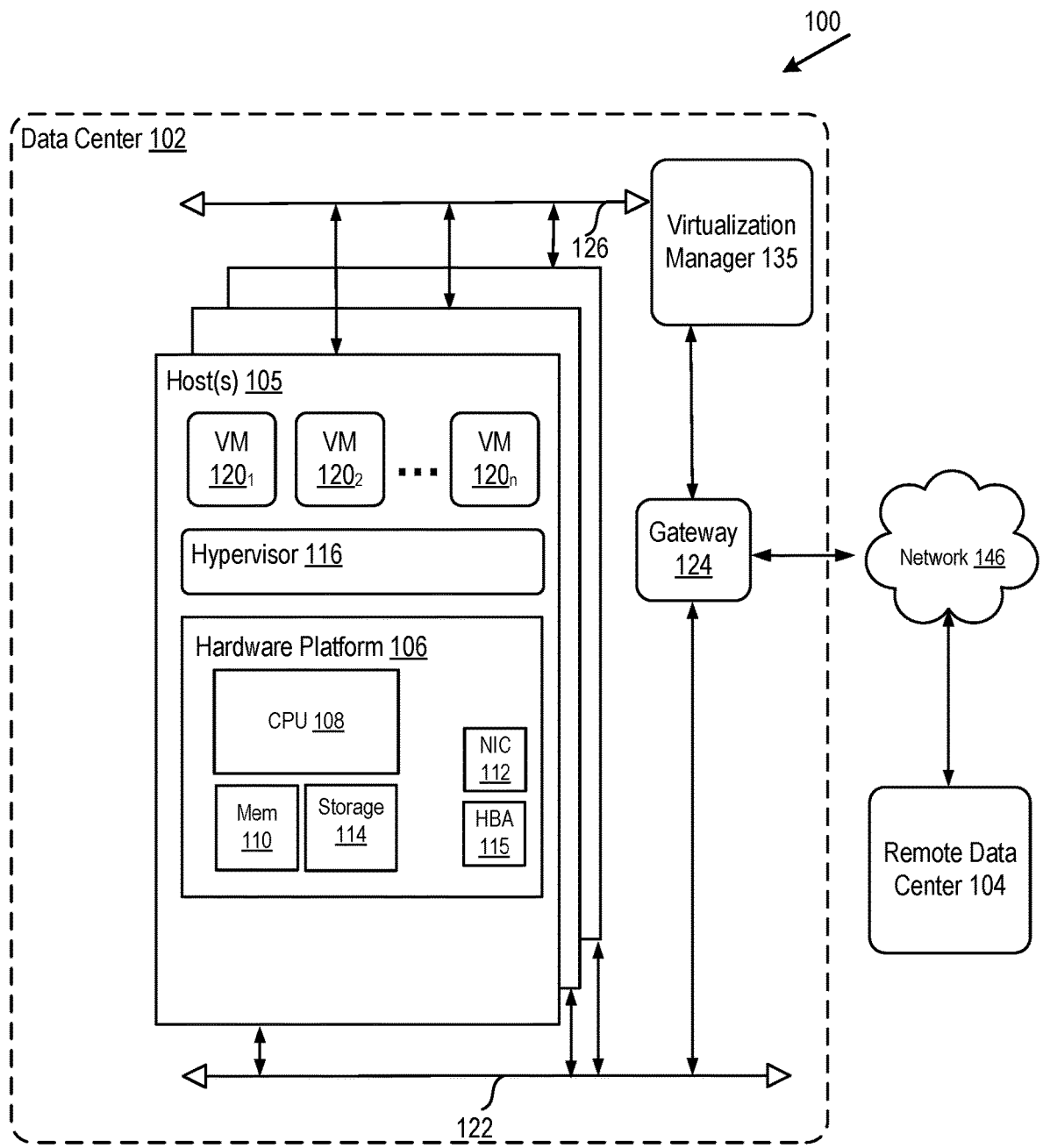
FIG. 1A depicts a block diagram of a computer system in accordance with certain aspects of the disclosure.

FIG. 1A depicts a block diagram of a computer system 100 in which one or more embodiments of the present disclosure may be utilized. Data center 102 may be a local data center or have one or more components located in a cloud data center. Data center 102 includes host(s) 105, a gateway 124, a virtualization manager 135, a management network 126, and a data network 122. Each of hosts 105 is typically on a server grade hardware platform 106, such as an x86 based hardware platform. Hosts 105 may be geographically co-located servers on the same rack or on different racks in data center 102.

Host 105 is configured with a virtualization layer, referred to here as a hypervisor 116, that abstracts processor, memory, storage, and networking resources of hardware platform 106 into multiple virtual machines $120_1$ to $120_n$ (collectively referred to as VMs 120 and individually referred to as VM 120). VMs 120 on the same host 105 may use any suitable overlaying guest operating system(s) and run concurrently with the other VMs 120.

Hypervisor 116 architecture may vary. In some aspects, hypervisor 116 is installed as system level software directly on hosts 105 and conceptually interposed between the physical hardware and guest operating systems in VMs 120. Alternatively, hypervisor 116 may conceptually run "on top of" guest operating systems in VMs 120. In some implementations, hypervisor 116 may comprise system level software as well as a privileged VM machine (not shown) that has access to the physical hardware resources of the host 105. In this implementation, a virtual switch, virtual tunnel endpoint (VTEP), etc., along with hardware drivers, may reside in the privileged VM. One example of hypervisor 116 that may be used is a VMware ESXi™ hypervisor provided as part of the VMware vSphere® solution made commercially available from VMware, Inc. of Palo Alto, Calif.

Hardware platform 106 of each host 105 may include components of a computing device such as one or more processors (CPUs) 108, system memory 110, a network interface 112, a storage system 114, a host bus adapter (HBA) 115, and other I/O devices such as, for example, a mouse and keyboard (not shown). CPU 108 is configured to execute instructions, for example, executable instructions that perform one or more operations described herein and that may be stored in memory 110 and in storage 114. Network interface 112 enables host 105 to communicate with other devices via a communication medium, such as data network 122 and/or management network 126. Network interface 112 may include one or more network adapters or ports, also referred to as Network Interface Cards (NICs), for connecting to one or more physical networks. Gateway 124 (e.g., executing as a virtual appliance) provides VMs 120 and other components in data center 102 with connectivity to network 146 used to communicate with other devices (e.g., a remote data center 104). In certain embodiments, data network 122 and management network 126 may be different physical networks as shown, and the hosts 105 may be connected to each of the data network 122 and management network 126 via separate NICs or separate ports on the same NIC. In certain embodiments, data network 122 and management network 126 may correspond to the same physical network, but different network segments, such as different subnets or different logical VLAN segments.

System memory 110 is hardware for allowing information, such as executable instructions, configurations, and other data, to be stored and retrieved. Memory 110 is where programs and data are kept when CPU 108 is actively using them. Memory 110 may be volatile memory or non-volatile memory. Host bus adapter (HBA) 115 couples host 105 to one or more external storages (not shown), such as a storage area network (SAN) or distributed virtual SAN. Other external storages that may be used include network-attached storage (NAS) and other network data storage systems, which may be accessible via NIC 112. Storage system 114 represents persistent storage device(s). Storage 114 may be one or more hard disks, flash memory modules, solid state disks, and/or optical disks. Although storage 114 is shown as being local to host 105, storage 114 may be external to host 105, such as by connection via HBA 115.

Virtualization manager 135 communicates with hosts 105 via a network, shown as a management network 126, and carries out administrative tasks for data center 102 such as managing hosts 105, managing local VMs 120 running within each host 105, provisioning VMs, migrating VMs from one host to another host, and load balancing between hosts 105. Virtualization manager 135 may be a computer program that resides and executes in a central server in data center 102 or, alternatively, virtualization manager 135 may run as a VM in one of hosts 105. One example of a virtualization manager is the vCenter Server™ product made available from VMware, Inc.

Figure 1B:
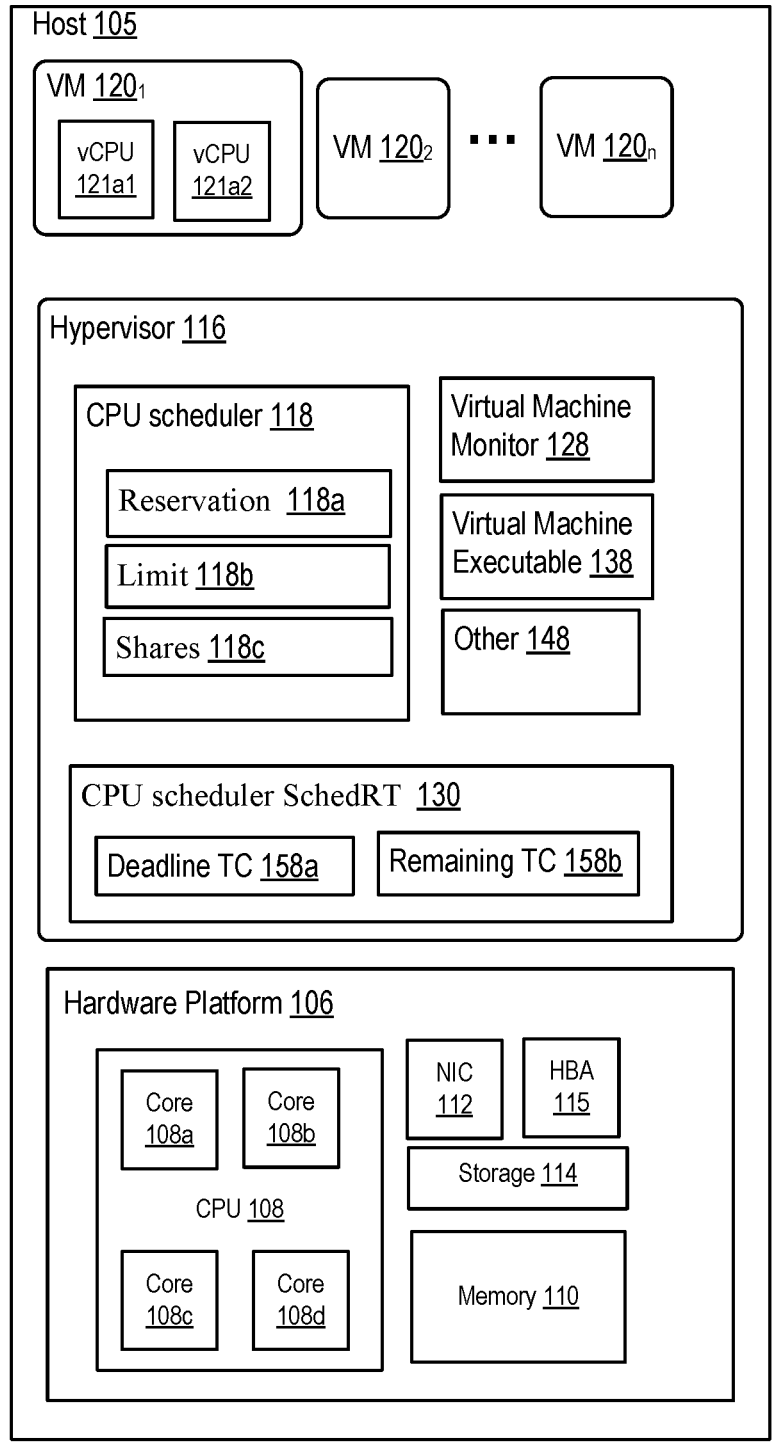
FIG. 1B is an expanded view of a host computer in accordance with certain aspects of the disclosure.

FIG. 1B depicts an expanded view of hypervisor 116 in host 105 from FIG. 1 in accordance with certain aspects of the disclosure. Host 105 includes VM $120_1$ configured with two vCPUs, vCPU 121a1 and vCPU 121a2. It will be appreciated that VMs 120 may be configured with a single vCPU or a plurality of vCPUs by hypervisor 116. It will be further appreciated that vCPU 121a1 and vCPU 121b2 are virtual processors that are allocated CPU resources from hardware platform 106, of host 105, by hypervisor 116.

Hypervisor 116 includes a CPU scheduler 118 and a CPU scheduler schedRT 130 (which may be referred to as a run time scheduler) for allocating pCPU resources (i.e., cores 108a-108d) to VMs 120 (i.e., to vCPUs of VMs 120). In certain aspects, a workload running in a VM 120 runs on a vCPU of the VM 120, which requires pCPU resources of a pCPU to actually execute. Accordingly, pCPU resources must be allocated to a vCPU, and accordingly the workload is scheduled for execution on the vCPU using the allocated pCPU resources, by one of CPU scheduler 118 or CPU scheduler schedRT 130. In some aspects, all workloads running in VMs 120 are scheduled for execution by CPU scheduler schedRT 130.

CPU scheduler 118 uses CPU scheduling policies such a proportional share based scheduler to implementation CPU resource allocation metrics reservation 118a, limit 118b, and shares 118c. It will be appreciated that these scheduling policies are not equipped to implement certain CPU resource allocation metrics, such as QoS based resource allocation metrics (e.g., a CPU resource allocation metric that provides a time period for executing a workload) because the scheduling policies described above are based on overall utilization (throughput) of tasks on a pCPU of a host. This means that using CPU scheduler 118 can result in vCPU latency for VMs executing workloads on a pCPU of about one second or more, meaning there may be one second or more of time in between when a VM requests use of a vCPU for processing a workload and when pCPU resources are actually made available to the vCPU for processing the workload. Further, the vCPUs using a scheduling policy from CPU scheduler 118 may also experience unbounded (or random) jitter as the latency may vary over time.

In accordance with certain aspects, CPU scheduler schedRT 130 may be based on any well-known scheduling policy (e.g., rate-monotonic scheduling (RMS), earliest deadline first (EDF), least slack time (LST), etc.) that is modified for implementing scheduling policies based on QoS based CPU resource allocation metrics as described below. CPU scheduler schedRT 130 dispatched by hypervisor 116 configures each of at least one vCPU (e.g., vCPU 121a1 of VM $120_1$) with CPU resource allocation metrics guaranteeing a certain percentage of pCPU resources (e.g., a reservation metric) within a certain time period (e.g., indicated by a QoS based CPU resource allocation metric). Accordingly, CPU scheduler schedRT 130 allocates to a vCPU of a VM one of one or more pCPUs every time period, wherein for every time period the one of the one or more pCPUs is allocated to the vCPU for a time period indicated by a QoS based CPU resource allocation metric and with a percentage of pCPU resources indicated by a reservation metric. For example, if CPU 108 in host 105 is a four core processor, and CPU scheduler schedRT 130 dispatched by hypervisor 116 configures vCPU 121a1 of VM $120_1$ with a CPU resource allocation metric guaranteeing a 50% reservation of CPU resources, and a QoS based CPU resource allocation metric indicating a 10,000 μs (i.e., 10 ms) periodic time period, then vCPU 121a1 of VM $120_1$ will run on one of cores 108a-108d in CPU 108 for at least 5 ms (i.e., 50% of 10 ms) every 10 ms time period, provided vCPU 121a1 has sufficient demand.

In certain aspects a QoS of a vCPU is satisfied if and only if its execution meets the requirements defined by a (QoS, Reservation) parameter pair (e.g., 10,000 μs, 50%). In certain aspects, a vCPU is considered "jitterless" when its execution substantially always meets the requirements defined by the (QoS, Reservation) parameter pair when processing a workload. It will be appreciated that it is typically easier to achieve a jitterless vCPU in a VM $120_1$ with a higher QoS parameter and a lower reservation parameter (e.g., 100 ms, 0.1%) than a vCPU in a VM $120_2$ with a lower QoS parameter and a higher reservation parameter (e.g., 100 μs, 50%) because even though VM $120_2$ has a larger reservation parameter for the pCPU resources, the QoS parameter is smaller resulting in less total clock cycles for VM $120_2$ to process a workload.

As explained above, failure to meet a (QoS, Reservation) parameter pair is referred to as jitter. Jitter can come from a variety of sources from VMs to the hypervisor layer itself (e.g., preemption delays, scheduling delays, interrupts, implicit contention, hardware non-maskable events, etc.).

A preemption delay is a significant source of jitter caused by non-preemptable code regions (e.g., spin locks, read-copy-update (RCU), system contexts, etc.). It will be appreciated that unless the entire virtualization layer is fully-preemptable, preemption delay may occur. A scheduling delay is a result of a CPU scheduler (e.g., CPU scheduler 118) scheduling a certain workload over another workload (e.g., to maximum throughput and/or overall performance). It will be appreciated a CPU scheduler configured to maximum throughput and/or overall performance may prevent the vCPU of a VM from meeting certain SLA QoS requirements of jitterless execution. Interrupts are another source of jitter. Interrupts can overtake a current workload. It will be appreciated that an interrupt is different from a preemption or scheduling delay because interrupts normally do not have their own workload to execute on a pCPU. Implicit contention from shared hardware resource is also a source of jitter (e.g., bus contention for cash/memory, remote memory access latency, device congestion, etc.). Hardware non-maskable events (e.g., system management interrupts (SMIs)) can also cause jitter as a hypervisor typically does not have control of when they occur or how long a non-maskable event will last.

Virtual machine monitor (VMM) 128 is a process that runs in a kernel of hypervisor 116 that is responsible for virtualizing the guest operating system instructions, and manages memory. In certain aspects, there is a VMM for each vCPU assigned to VMs 120. A VMM passes storage and network I/O requests to the hypervisor 116, and passes other requests to a virtual machine executable (VMX) 138 process.

VMX 138 is a process that runs in a kernel of hypervisor 116 that is responsible for handling I/O to devices and communicating with user interfaces, snapshot managers, and remote consoles, etc.

In certain aspects VMM 128 is preemptable by CPU scheduler schedRT 130. More specifically, even if VMM 128 is taking actions that are not fully preemptable (e.g., taking page faults, emulating instructions, and/or switching to VMX), it may operate as if it were fully preemptable because in certain aspects, hypervisor 116 may configure a host (e.g., host 105 in FIG. 1) to have preallocated memory as well as device pass-through to minimize such interference.

For VMs with preallocated memory and device pass-through (e.g., VM $120_1$) it will be appreciated that execution jitters may come from auxiliary contexts or sub-components of a hypervisor 116 that are not part of VMM 128. In certain aspects, the delay (or overhead) of taking an exit command plus a scheduler dispatch, although non-preemptable, is not a significant source of jitter compared to other sources of jitters as the overhead is small (e.g., about 10 µs). Thus, it will be appreciated that certain execution jitters may nevertheless be present in certain aspects of jitterless operation set forth in this disclosure.

In certain aspects, pCPU resources are abstracted into a jitterless zone by a hypervisor setting or CPU scheduler setting. A jitterless zone is used for execution of jitterless workloads (i.e., workloads associated with a certain (QoS, Reservation) parameter pair requirement, such as set forth in an SLA). A jitterless zone is different from physical core pinning as pCPU resources in a jitterless zone may execute jitterless workloads and non-jitterless workloads (i.e., workloads not associated with a (QoS, Reservation) parameter pair requirement). The VMs running inside the jitterless zone may have preallocated memory as well as device pass-through to further minimize jitter. It will be appreciated that in certain aspects, all hypervisor specific contexts are executed on pCPUs outside of the jitterless zone. The pCPUs in the jitterless zone are scheduled to execute workloads by a run time scheduler (e.g., CPU scheduler schedRT 130), which can preempt any workloads in the jitterless zone. For example, CPU scheduler schedRT 130 can preempt non jitterless workload scheduled for execution in a jitterless zone and migrate those tasks to other pCPUs outside the jitterless zone and schedule a jitterless workload for execution on the pCPU resources that were previously unavailable.

In certain aspects, the number of pCPUs in the jitterless zone is based on the QoS and bandwidth requirements for one or more jitterless VMs (e.g., all jitterless VMs). Thus it will be appreciated that the size of the jitterless zone may be based on how many pCPUs are needed in the jitterless zone to satisfy all VMs with QoS and bandwidth requirements. In certain aspects, one or more algorithms can be used to determine the size of jitterless zone (e.g., based in part on a CPU schedRT scheduling policy (e.g., (RMS), (EDF), (LST), etc.). For example, when a new VM is powered on, the size of jitterless zone may be dynamical selected by CPU scheduler schedRT 130 (e.g., based on how many pCPUs are needed in the jitterless zone to satisfy all VMs on a host with QoS and bandwidth requirements). In other aspects, when a VM is powered off, the size of jitterless zone may be dynamical selected (e.g., by removing pCPUs from the jitterless zone). In yet other aspects, if a VM changes its QoS or bandwidth requirement at any time, the size of jitterless zone can be dynamical selected in real time. In yet other aspects, the number of pCPUs in the jitterless zone may be dynamical selected periodically (e.g., daily, hourly, etc.). Thus, it will be appreciated that the jitterless zone can be dynamical selected (e.g., pCPUs added or removed) in real-time based one or more VM QoS and bandwidth requirements.

It will be appreciated that a preempted workload migrated to pCPU resources outside the jitterless zone may experience jitter and increased latency time so that the jitterless workload may be executed without jitter and within a certain latency (e.g., provided by a (QoS, Reservation) parameter pair). In certain aspects, all the contexts executed inside the jitterless zone are VMM contexts, which it will be appreciated are fully preemptable when running a guest operating system.

Figure 1C:
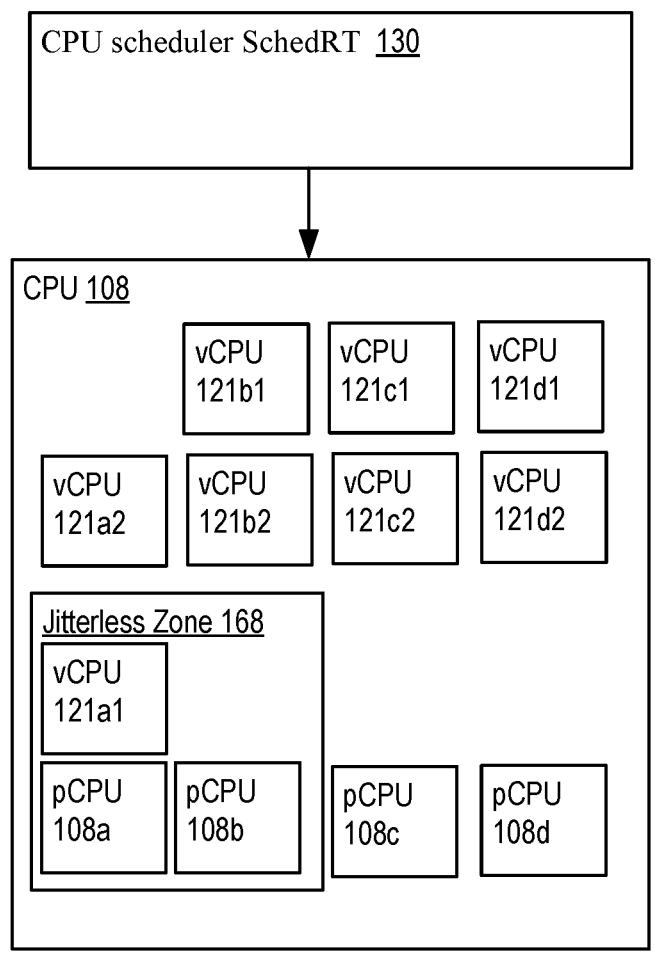
FIG. 1C is an expanded view of a CPU from a host computer in accordance with certain aspects of the disclosure.

FIG. 1C depicts a block diagram of an abstracted processing system abstracted by hypervisor 116 on host 105 in FIG. 1B that includes an abstracted jitterless zone 168 controlled by run time scheduler CPU scheduler schedRT 130. The abstracted processing system includes a plurality of pCPUs 108a-d corresponding to cores 108a-d in FIG. 1B. In other aspects, CPU 108 from FIG. 1B may be abstracted into more pCPUs (e.g., 8 logical pCPUs if hyper threading is enabled).

FIG. 1C shows pCPUs 108a and 108b located inside jitterless zone 168 and pCPUs 108c and 108d located outside jitterless zone 168. It will be appreciated that other configurations are within the scope if the disclosure. The pCPUs 108a and 108b located in jitterless zone 168 have preallocated memory and/or device pass-through to minimize jitter. It will be appreciated that in addition to preallocated memory and device pass-through, other techniques may be used to reduce jitter (e.g., by implementing techniques that minimizing input/output interference, minimizing memory interference, etc.)

In certain aspects, a jitterless VM (e.g., a jitterless VM such as VM $120_1$ in FIG. 1C) has at least one vCPU that is scheduled by CPU scheduler schedRT 130 to remain inside jitterless zone 168 and run workloads (e.g., execute tasks) on one or more jitterless vCPUs (e.g., vCPU 121a1) which are allocated resources of one or more of pCPUs 108a and 108b in jitterless zone 168. Normal VMs (e.g., a non-jitterless VM (e.g., VMs 120$_2$-n in FIG. 1B)) are free to run workloads on non-jitterless vCPUs (e.g., vCPUs 121b1-121d2) allocated resources of one or more of pCPUs 108c and 108d outside of jitterless zone 168. In certain aspects, as long as the vCPUs of jitterless VMs remain inside jitterless zone 168 (i.e., a jitterless vCPU is only allocated pCPU resources of pCPUs within jitterless zone 168), vCPUs of normal VMs are free to be allocated resources of any of the plurality of pCPUs in the jitterless zone 168 (e.g., pCPU 108a and/or pCPU 108b). Therefore workloads of such normal VMs are free to run on any of the plurality of pCPUs in the jitterless zone 168. Within jitterless zone 168, workloads are mostly preemptable, and when a jitterless VM (e.g., VM 120$_1$) needs to execute a jitterless workload using a jitterless vCPU (e.g., jitterless vCPU 121a1), CPU scheduler schedRT 130 provides priority to the jitterless VM so that the jitterless VM executes the workload on pCPU 108a or 108b in jitterless zone 168 without jitter (i.e., meeting a certain (QoS, Reservation) parameter pair) by allocating resources of one of pCPU 108a or 108b to the jitterless vCPU of the jitterless VM. It will be appreciated that non-jitterless workloads may be migrated outside jitterless zone 168 (e.g., to vCPUs outside the jitterless zone using pCPUs outside the jitterless zone). In certain aspects, a VM has one or more vCPU in the jitterless zone 168 (e.g., vCPU 121a1) and one or more vCPU outside the jitterless zone 168 (e.g., vCPU 121a2) for executing non-jitterless workloads on the same VM. In other aspects, all vCPUs associated with a VM are inside the jitterless zone 168 (i.e., only allocated pCPU resources within the jitterless zone).

In certain aspects, workloads on non-jitterless VMs will be executed by a pCPU in jitterless zone 168 when there is no active demand from a jitterless VM (e.g., after active or pending workloads on jitterless VMs are satisfied). Thus CPU scheduler schedRT 130 preserves certain work-conserving properties for resource utilization and consolidation at least because pCPUs 108a-108d are able to be time shared by both jitterless VMs and non-jitterless VM. For example, vCPU 121b1 may execute a non-jitterless task on pCPU 108a when pCPU 108a is available for non jitterless workloads.

Referring to FIG. 1B, in certain aspects, CPU scheduler schedRT 130 uses a QoS based CPU resource allocation metric to determine deadline TC 158a and a CPU reservation based resource allocation metric to determine remaining TC 158b. CPU scheduling policy parameters deadline TC 158a and remaining TC 158b are used by CPU scheduler schedRT 130 in part to schedule jitterless workloads and non-jitterless workloads. In certain aspects, non-jitterless workloads are scheduled in part with another CPU scheduler (e.g., CPU scheduler 118).

Deadline TC 158a in FIG. 1B is a CPU scheduling policy parameter that denotes a reference time (e.g., time stamp) at which the next scheduling point is scheduled to occur for pCPU resources in a jitterless zone. Remaining TC 158b is a CPU scheduling policy parameter that is a value (e.g., a signed 64-bit value) indicating a remaining pCPU quota (e.g., clock cycles) for the pCPU resources in the jitterless zone before the next periodic deadline based on deadline TC 158a. More specifically, in certain aspects, a positive remaining TC 158b value indicates a positive number of remaining CPU clock cycles for jitterless pCPU resources (e.g., pCPUs 108a and 108b in jitterless zone 168 in FIG. 1C) before a deadline time parameter set by deadline TC 158a. A zero or negative remaining TC 158b value indicates that all or more than all of the clock cycles for the jitterless pCPU resources are allocated.

In certain aspects, CPU scheduler schedRT 130 selects which vCPU of a VM (e.g., vCPU 121a of VM 120$_1$ in FIG. 1B) is scheduled to a pCPU (e.g., pCPU 108a in FIG. 1C). For example, CPU scheduler schedRT 130 allocates pCPU resources within jitterless zone 168 to a particular vCPU for running a jitterless workload of the VM. If the pCPU resources in the jitterless zone 168 are already occupied (e.g., VM 120$_2$ is running a non-jitterless workload on pCPU resources in the jitterless zone 168,) then CPU scheduler schedRT 130 can preempt the currently running VM and execute the jitterless workload by migrating the non-jitterless workload to other pCPU resources outside the jitterless zone 168 (e.g., pCPUs 108c and 108d). Thus it will be appreciated that CPU scheduler schedRT 130 may include an accounting and preemption aspect.

In certain aspects, CPU scheduler schedRT 130 aligns deadline TC 158a and remaining TC 158b on descheduling operations. It will be appreciated that CPU scheduler schedRT 130 may allow a VM to run well beyond its reservation if there are no active workloads pending. In this case, CPU scheduler schedRT 130 can round up the deadline of a currently-executing VM using pCPU resources in the jitterless zone 168 to the next closest deadline (e.g., a multiple of deadline TC 158a). In other aspects, a jitterless vCPU allocated pCPU resources in the jitterless zone 168 may wake up after a long period of inactivity, and its deadline TC 158a may need to be re-aligned to avoid an unintended priority boost (e.g., which may occur when a previous deadline TC 158a is inadequate). It will also be appreciated that occasionally a VM may miss its reservation, which in certain aspects CPU scheduler schedRT 130 can treat as a yield of its allocated bandwidth.

In certain aspects, CPU scheduler schedRT 130 operates as an earliest deadline first (EDF) based scheduler and its dispatch logic allocates pCPU resources in the jitterless zone 168 to a vCPU with the earliest deadline based on deadline TC 158a. In other aspects, CPU scheduler schedRT 130 may use remaining TC 158b to favor certain vCPUs (e.g., vCPUs with a smaller current usage). As noted above, CPU scheduler schedRT 130 may use other scheduling policies without deviating from the scope of the disclosure.

In certain aspects, CPU scheduler schedRT 130 is configured to prefer an active jitterless vCPU (e.g., vCPU 121a1 in FIG. 1C) with a positive remaining TC 158b value for pCPU resources in the jitterless zone 168 over a normal vCPU (e.g., vCPU 121b1 in FIG. 1C). In other aspects, when no active jitterless VMs are runnable, CPU scheduler schedRT 130 may use a proportional share-based algorithm (e.g., a scheduling policy not based deadline TC 158a and remaining TC 158b) (e.g., a scheduling policy based in part on CPU resource allocation metrics 118a-118c) to maximize throughput on all pCPU resources, including pCPU resources in the jitterless zone 168.

In certain aspects, CPU scheduler schedRT 130 dispatch logic will set a rescheduling timer with zero tolerance and prioritize scheduling over absolute throughput. In other aspects, CPU scheduler schedRT 130 sets a rescheduling timer before switching out a vCPU if there is one or more pending active jitterless vCPUs in queue.

It will be appreciated that certain virtualization software bounds execution skews among vCPUs of a VM (e.g., below 3 ms as default threshold) to alleviate problems such as lock-holder preemption in the guest. In certain aspects, in CPU scheduler schedRT 130 synchronous forward-progress becomes implicit when deadline TC 158a is sufficiently small, as all vCPUs are guaranteed the same amount of pCPU resources during the periodic deadline TC 158a time period. For longer deadline TC 158a time periods that exceed the skew threshold, CPU scheduler schedRT 130 can automatically scale down the time period and provide a VM with a finer-grain of QoS enforcement (e.g., a smaller deadline TC 158a time period). It will be appreciated that an adaptive deadline TC 158a time period can mitigate the need for expensive bounded-skew logic regardless of user-defined deadline TC 158a time periods. In other aspects, it is beneficial to align executions of vCPUs of the same VM during each deadline TC 158a time period. Hence, a "co-run" bonus may be used as a tie-breaker for CPU scheduler schedRT 130 to give vCPUs a priority boost.

Figure 2:
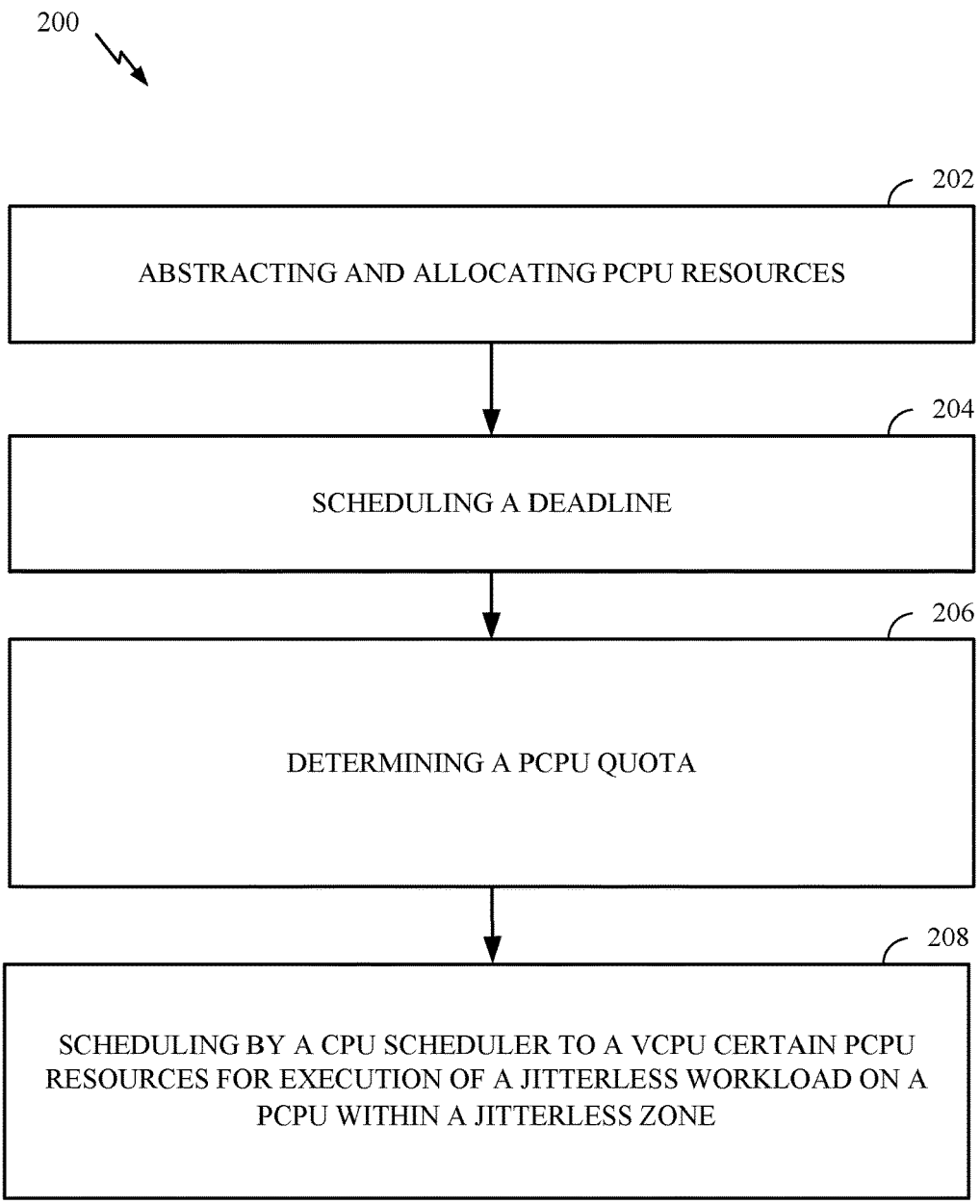
FIG. 2 depicts a flow diagram of a method of scheduling a jitterless workload, in accordance with certain aspects of the disclosure.

FIG. 2 depicts a flow diagram of a method 200 for scheduling a jitterless workload on a VM for execution on a jitterless pCPU. At block 202, a hypervisor associated with a virtual machine (e.g., hypervisor 116 associated with VM 120₁ in host 105 in FIG. 1B) deploys a CPU scheduler (e.g., CPU scheduler schedRT 130 in FIG. 1B). In certain aspects, multiple CPU schedulers are deployed by hypervisor 116 (e.g., CPU scheduler schedRT 130 and CPU scheduler 118 in FIG. 1B). In other aspects, the functions of multiple CPU schedulers are integrated into a single CPU scheduler. The pCPU resources of a host are allocated to one or more vCPUs of one or more VMs, wherein a subset of the pCPU resources are located in a jitterless zone (e.g., jitterless zone 168 in FIG. 1B). The pCPU resources located in the jitterless zone have preallocated memory as well as device pass-through to minimize jitter. In certain aspects, one or more vCPUs of a VM are allocated the subset of pCPU resources within the jitterless zone (vCPU 121a1 in FIG. 1C) for executing jitterless workloads without jitter within a specified (QoS, Reservation) parameter pair (e.g., 10,000 μs, 50%).

At block 204, a CPU scheduler (e.g., CPU scheduler schedRT 130 in FIG. 1B) schedules a deadline for the pCPU resources within the jitterless zone. The deadline is a periodic deadline associated with a vCPU of a VM allocated pCPU resources within the jitterless zone, wherein the periodic deadline indicates a time period for executing a jitterless workload with a vCPU using pCPU resources within the jitterless zone (e.g., vCPU 121a1 executing a jitterless workload using pCPUs 108a and/or 108b in FIG. 1C).

At block 206, the method further includes determining a pCPU quota that is a value (e.g., a signed 64-bit value) indicating a remaining pCPU quota indicating a number of remaining CPU clock cycles associated with a jitterless pCPU (e.g., pCPUs 108a and/or 108b in FIG. 1C) before the deadline scheduled in block 204. A negative quota indicates that the all or more than all of the jitterless pCPU's clock cycles are currently allocated. It will be appreciated that any (QoS, Reservation) parameter pair may be selected (e.g., by an administrator or a user), for example, to meet a certain SLA requirement.

At block 208, the method further includes scheduling a vCPU of a VM certain pCPU resources for execution of a jitterless workload, wherein the pCPU resources are located within a jitterless zone (e.g., jitterless zone 168 in FIG. 1C). It will be appreciated that the pCPU resources may be currently occupied (e.g., running a non jitterless task). In this case, the CPU scheduler may preempt the vCPU of a VM running a non-jitterless task on pCPU resources within the jitterless zone and migrate the workload to pCPU resources outside the jitterless zone.

It should be understood that, for any process described herein, there may be additional or fewer steps performed in similar or alternative orders, or in parallel, within the scope of the various embodiments, consistent with the teachings herein, unless otherwise stated.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless of the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of scheduling a jitterless workload on a virtual machine (VM) executing on a host comprising one or more physical central processing units (pCPUs) comprising a first subset of the one or more pCPUs and a second subset of the one or more pCPUs, the method comprising:

creating a jitterless zone, wherein the jitterless zone comprises the first subset of the one or more pCPUs;

determining whether a virtual central processing unit (vCPU) of the VM is used to execute a jitterless workload or a non-jitterless workload;

when the vCPU is determined to execute the jitterless workload:

allocating by a central processing unit (CPU) scheduler to the vCPU at least one of the pCPUs in the jitterless zone; and scheduling the jitterless workload for execution by the vCPU on the allocated at least one of the pCPUs in the jitterless zone; and when the vCPU is determined to execute the non-jitterless workload:

allocating by the CPU scheduler to the vCPU at least one of the pCPUs of the first subset or the second subset; and scheduling the non-jitterless workload for execution by the vCPU on the allocated at least one of the pCPUs of the first subset or the second subset.

2. The method of claim 1, wherein allocating by the CPU scheduler to the vCPU of the VM at least one of the pCPUs in the jitterless zone comprises:

allocating at least one of the pCPUs in the jitterless zone to the vCPU of the VM for a periodic time period.

3. The method of claim 2, wherein allocating at least one of the pCPUs in the jitterless zone to the vCPU of the VM for a periodic time period is based at least in part on a quota.

4. The method of claim 3, wherein the quota is a remaining number of clock cycles on the at least one pCPU in the jitterless zone during the periodic time period.

5. The method of claim 1, wherein the VM comprises a plurality of vCPUs, and wherein each of the plurality of vCPUs are allocated at least one of the pCPUs in the jitterless zone.

6. The method of claim 1, wherein the VM comprises a plurality of vCPUs, and wherein only a subset of the plurality of vCPUs are allocated at least one of the pCPUs in the jitterless zone.

7. The method of claim 1, wherein the vCPU is allocated a same one of the at least one pCPUs in the jitterless zone for each of a plurality of jitterless workloads.

8. The method of claim 1, wherein the vCPU is allocated a different one of the at least one pCPUs in the jitterless zone for each of a plurality of jitterless workloads.

9. The method of claim 1, wherein scheduling the jitterless workload for execution by the vCPU on the allocated at least one pCPU in the jitterless zone further comprises:

preempting a non-jitterless workload on the allocated at least one pCPU in the jitterless zone before scheduling the jitterless workload for execution.

10. The method of claim 1, wherein creating a jitterless zone comprises:

dynamically selecting by the CPU scheduler a number of pCPUs in the jitterless zone.

11. A non-transitory computer readable medium comprising instructions to be executed in a processor of a computer system, and the instructions when executed in the processor cause the computer system to carry out a method of scheduling a jitterless workload on a virtual machine (VM) executing on a host comprising one or more physical central processing units (pCPUs) comprising a first subset of the one or more pCPUs and a second subset of the one or more pCPUs, the method comprising:

creating a jitterless zone, wherein the jitterless zone comprises the first subset of the one or more pCPUs;

determining whether a virtual central processing unit (vCPU) of the VM is used to execute a jitterless workload or a non-jitterless workload;

when the vCPU is determined to execute the jitterless workload:
- allocating by a central processing unit (CPU) scheduler to the vCPU at least one of the pCPUs in the jitterless zone; and
- scheduling the jitterless workload for execution by the vCPU on the allocated at least one of the pCPUs in the jitterless zone; and when the vCPU is determined to execute the non-jitterless workload:
- allocating by the CPU scheduler to the vCPU at least one of the pCPUs of the first subset or the second subset; and
- scheduling the non-jitterless workload for execution by the vCPU on the allocated at least one of the pCPUs of the first subset or the second subset.

12. The non-transitory computer readable medium of claim 11, wherein allocating by the CPU scheduler to the vCPU of the VM at least one of the pCPUs in the jitterless zone comprises:
- allocating at least one of the pCPUs in the jitterless zone to the vCPU of the VM for a periodic time period.

13. The non-transitory computer readable medium of claim 12, wherein allocating at least one of the pCPUs in the jitterless zone to the vCPU of the VM for a periodic time period is based at least in part on a quota.

14. The non-transitory computer readable medium of claim 13, wherein the quota is a remaining number of clock cycles on the at least one pCPU in the jitterless zone during the periodic time period.

15. The non-transitory computer readable medium of claim 11, wherein the VM comprises a plurality of vCPUs, and wherein each of the plurality of vCPUs are allocated at least one of the pCPUs in the jitterless zone.

16. The non-transitory computer readable medium of claim 11, wherein the VM comprises a plurality of vCPUs, and wherein only a subset of the plurality of vCPUs are allocated at least one of the pCPUs in the jitterless zone.

17. The non-transitory computer readable medium of claim 11, wherein the vCPU is allocated a same one of the at least one pCPUs in the jitterless zone for each of a plurality of jitterless workloads.

18. The non-transitory computer readable medium of claim 12, wherein the vCPU is allocated a different one of the at least one pCPUs in the jitterless zone for each of a plurality of jitterless workloads.

19. The non-transitory computer readable medium of claim 12, wherein scheduling the jitterless workload for execution by the vCPU on the allocated at least one pCPU in the jitterless zone further comprises:
- preempting a non-jitterless workload on the allocated at least one pCPU in the jitterless zone before scheduling the jitterless workload for execution.

20. A computer system comprising:
a virtual machine (VM) executing on a host comprising one or more physical central processing units (pCPUs) comprising a first subset of the one or more pCPUs and a second subset of the one or more pCPUs and configured to perform a method of scheduling a jitterless workload on a VM comprising:
- creating a jitterless zone, wherein the jitterless zone comprises the first subset of the one or more pCPUs;
- determining whether a virtual central processing unit (vCPU) of the VM is used to execute a jitterless workload or a nonjitterless workload;
- when the vCPU is determined to execute the jitterless workload:
  - allocating by a central processing unit (CPU) scheduler to the vCPU at least one of the pCPUs in the jitterless zone; and
  - scheduling the jitterless workload for execution by the vCPU on the allocated at least one of the pCPUs in the jitterless zone; and
- when the vCPU is determined to execute the non-jitterless workload:
  - allocating by the CPU scheduler to the vCPU at least one of the pCPUs of the first subset or the second subset; and
  - scheduling the non-jitterless workload for execution by the vCPU on the allocated at least one of the pCPUs of the first subset or the second subset.

21. The computing system of claim 20, wherein allocating by the CPU scheduler to the vCPU of the VM at least one of the pCPUs in the jitterless zone comprises:
- allocating at least one of the pCPUs in the jitterless zone to the vCPU of the VM for a periodic time period.

* * * * *